(12) United States Patent
Sarcinella

(10) Patent No.: US 9,266,659 B2
(45) Date of Patent: Feb. 23, 2016

(54) FLEXIBLE CONTAINER HAVING A BUILT-IN AUTO-HEATING OR AUTO-REFRIGERATING ELEMENT

(75) Inventor: Giuseppe Sarcinella, Riazzino (CH)

(73) Assignee: Suricate SA, Balerna (CH)

( * ) Notice: Subject to any disclaimer, the term of this patent is extended or adjusted under 35 U.S.C. 154(b) by 227 days.

(21) Appl. No.: 13/824,350

(22) PCT Filed: Sep. 26, 2011

(86) PCT No.: PCT/IB2011/002223
§ 371 (c)(1),
(2), (4) Date: Mar. 16, 2013

(87) PCT Pub. No.: WO2012/038819
PCT Pub. Date: Mar. 29, 2012

(65) Prior Publication Data
US 2013/0174600 A1    Jul. 11, 2013

(30) Foreign Application Priority Data

Sep. 24, 2010   (CH) ..................................... 1560/10

(51) Int. Cl.
*B65D 81/34*    (2006.01)
*B65D 81/32*    (2006.01)
(Continued)

(52) U.S. Cl.
CPC ........ *B65D 81/3484* (2013.01); *B65D 75/5883* (2013.01); *B65D 77/04* (2013.01); *B65D 81/3272* (2013.01); *C09K 5/18* (2013.01); *F25D 5/02* (2013.01); *B65D 2205/00* (2013.01);
(Continued)

(58) Field of Classification Search
CPC ........... B65D 81/3484; B65D 81/3272; B65D 2575/586; B65D 2205/00; B65D 2577/042; B65D 75/5883; F25D 5/02; F25D 2332/801
USPC ...................................... 62/457.2, 457.4, 530
See application file for complete search history.

(56) References Cited

U.S. PATENT DOCUMENTS 2,907,173 A     10/1959  Robbins
3,887,346 A  *  6/1975  Erdman ............................... 62/4
(Continued)

FOREIGN PATENT DOCUMENTS

CN          2626918 Y       7/2004
EP          1896343         3/2008
(Continued)

OTHER PUBLICATIONS

PCT International Search Report from PCT/IB2011/002223 dated Feb. 14, 2012.
(Continued)

*Primary Examiner* — Mohammad M Ali
(74) *Attorney, Agent, or Firm* — Ladas & Parry, LLP

(57) ABSTRACT

The flexible container (1) with incorporated internal thermal exchange is shaped like an envelope or bag cascade multi-pocket inside. It is an administrator, portable disposable dispenser of a consumer and/or necessity product to be heated or cooled, exploiting endothermic or exothermic reactions generated by breaking by pressure of the bag (3) of the reactive liquid (31). The peculiarity of this execution is that the reaction chamber (2) is fully immersed into the consumer product (6) and is provided with a valve (10) controlling a possible pressure generated by the chemical reaction, the reaction bags (3, 4) inside developing the concept "bag in bag" or "bag in bag in bag".

20 Claims, 8 Drawing Sheets

Figure 1:
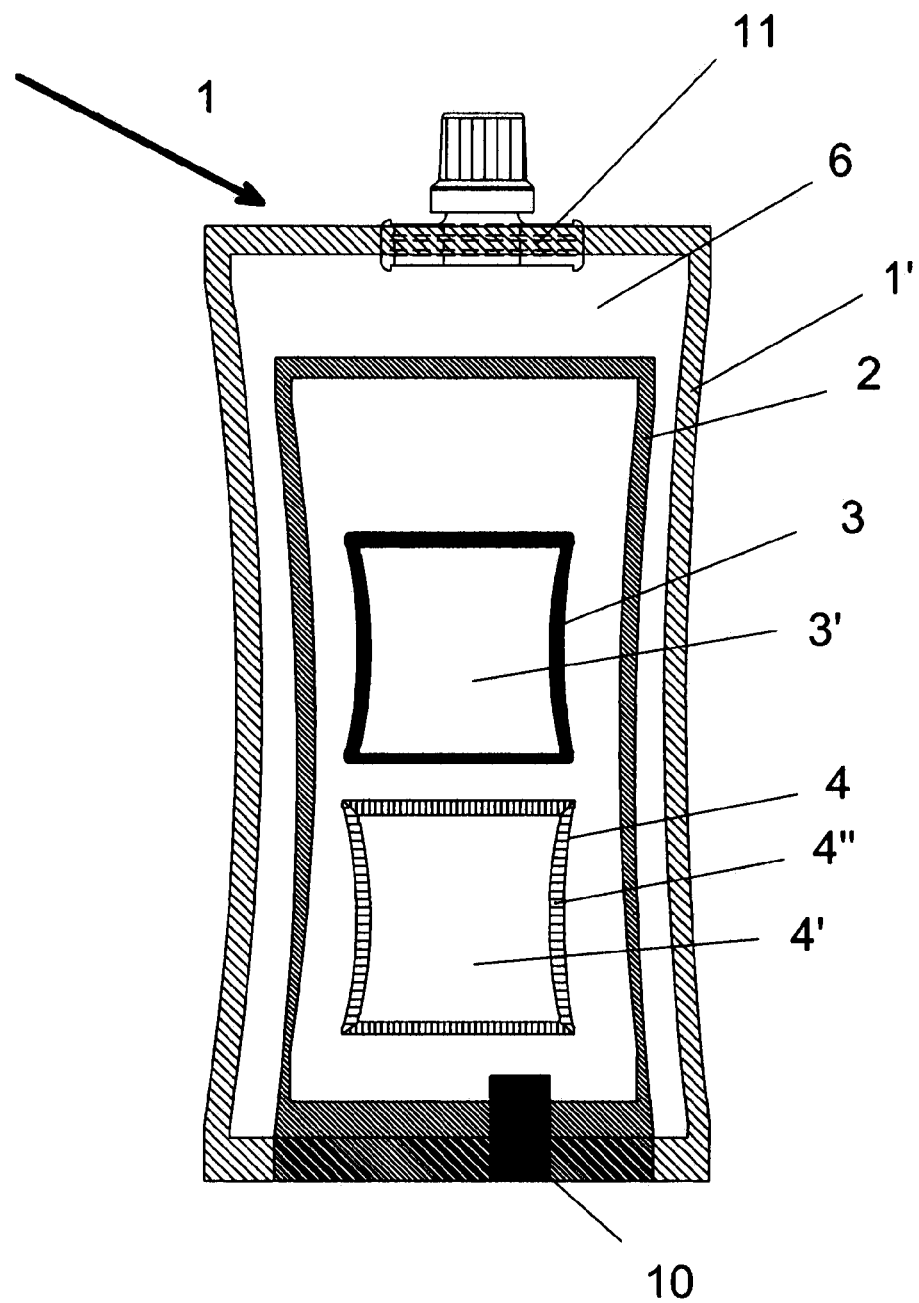

(51) Int. Cl.
*C09K 5/18* (2006.01)
*F25D 5/02* (2006.01)
*B65D 75/58* (2006.01)
*B65D 77/04* (2006.01)

(52) U.S. Cl.
CPC ..... *B65D2575/586* (2013.01); *B65D 2577/042* (2013.01); *F25D 2331/801* (2013.01)

(56) References Cited

U.S. PATENT DOCUMENTS

| | | | |
|---|---|---|---|
| 4,895,135 | A | 1/1990 | Hamasaki |
| 5,534,020 | A * | 7/1996 | Cheney et al. ............. 607/108 |
| 7,162,890 | B2 * | 1/2007 | Mogil et al. .............. 62/457.7 |
| 7,422,143 | B2 * | 9/2008 | Mayer .................. 229/103.11 |
| 2003/0000517 | A1 | 1/2003 | Joseph et al. |

FOREIGN PATENT DOCUMENTS

| | | |
|---|---|---|
| JP | S60-041351 (U) | 3/1985 |
| JP | H1-122475 (U) | 8/1989 |
| JP | 2004-512868 | 4/2004 |
| JP | 2004-534699 | 11/2004 |
| JP | 2005-501623 | 1/2005 |
| JP | 2008089214 | 4/2008 |
| JP | 2009161188 | 7/2009 |
| WO | 02/30251 | 4/2002 |
| WO | 03/002425 | 1/2003 |
| WO | 03/021158 | 3/2003 |
| WO | 2006/074260 | 7/2006 |
| WO | 2007/000626 | 1/2007 |
| WO | 2008/082283 | 7/2008 |

OTHER PUBLICATIONS

PCT International Preliminary Report on Patentability Chapter I (with Written Opinion) from PCT/IB2011/002223 dated Mar. 26, 2013.

Office Action from Chinese Patent Application No. 201180038267.4 dated Jan. 9, 2014 with Search Report and its English translation.

Office Action from Japanese Patent Application No. 2013-529725 dated May 26, 2015 with its English summary.

* cited by examiner

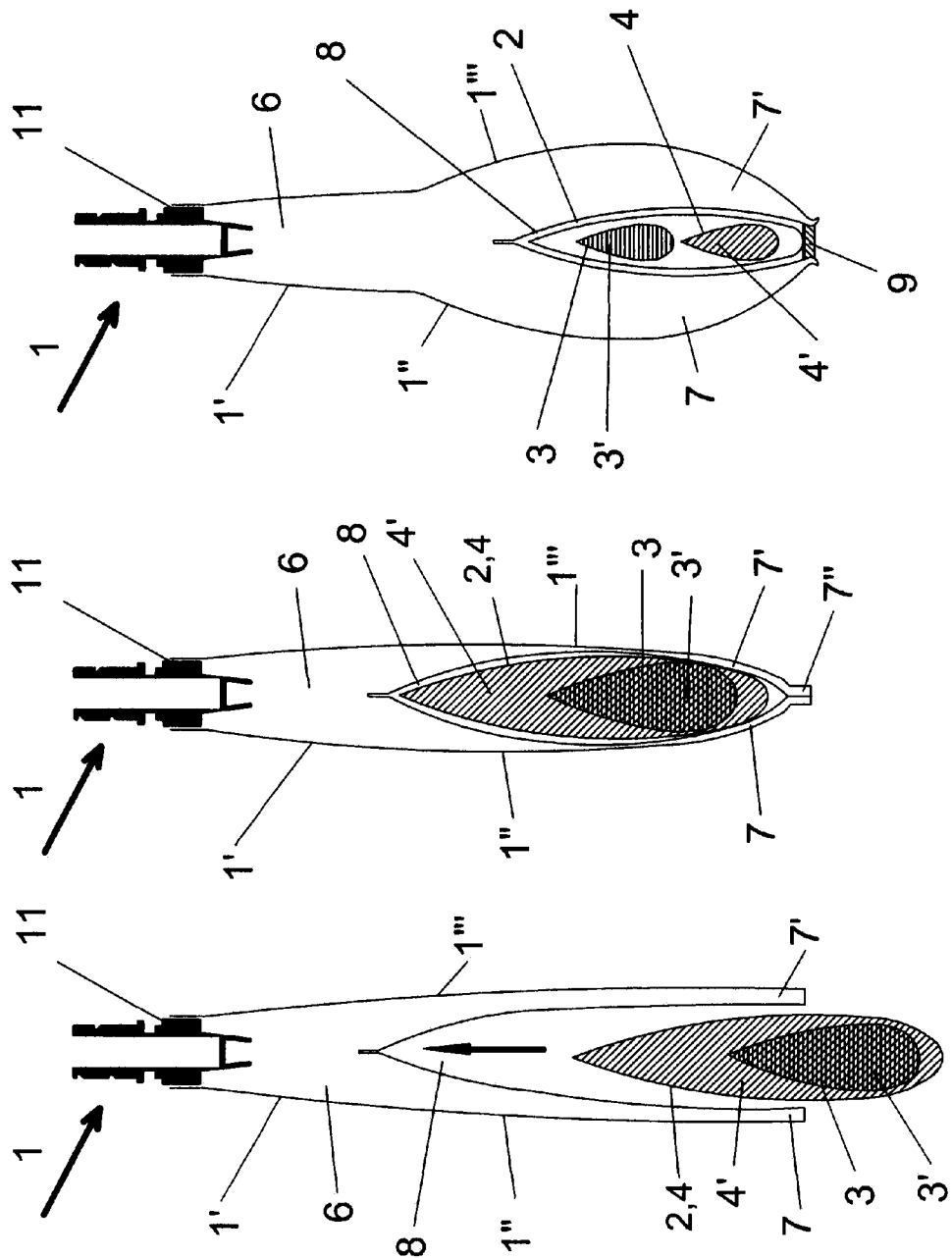

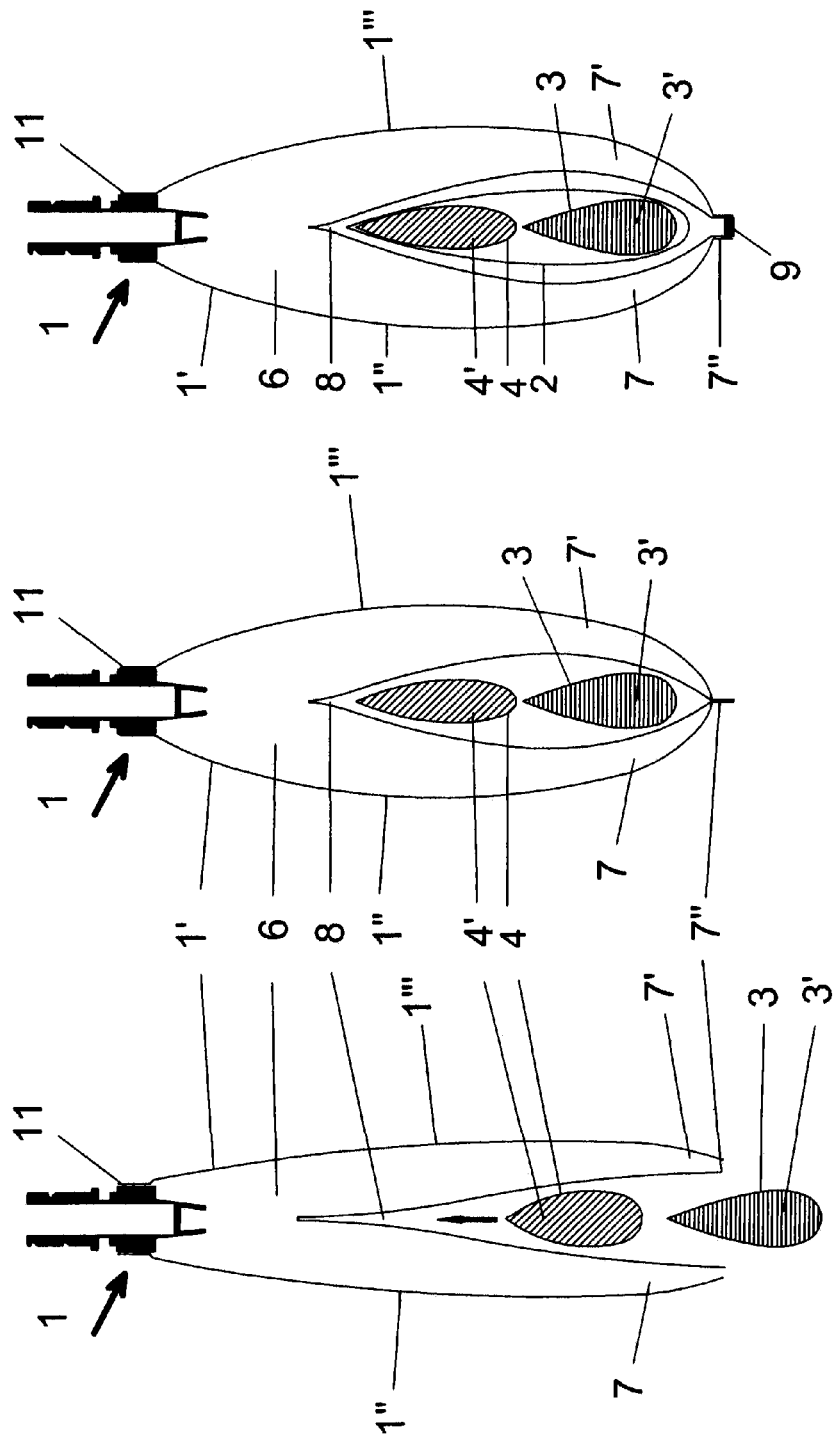

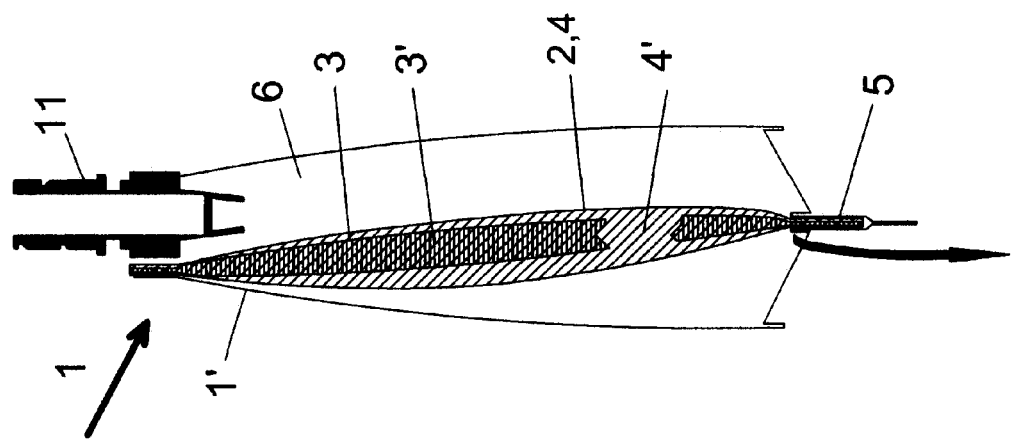
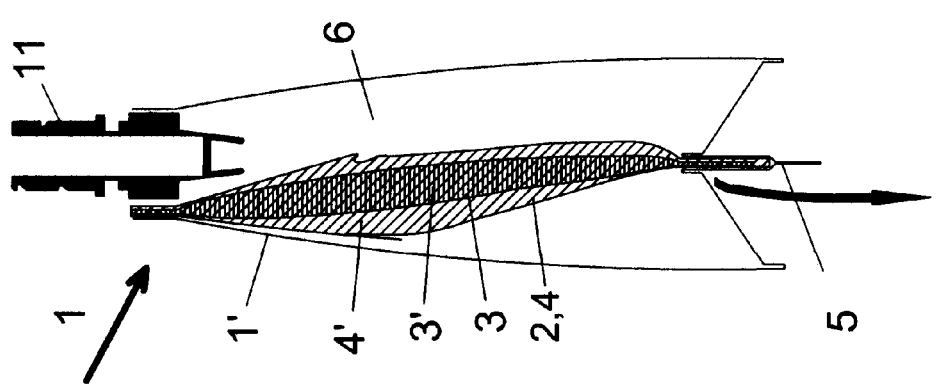
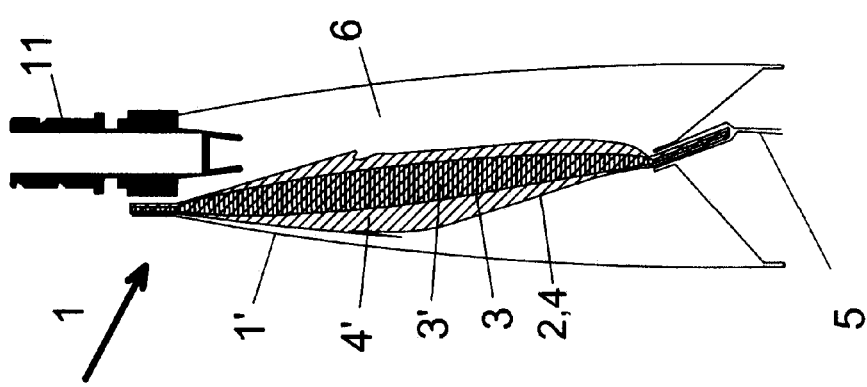

FLEXIBLE CONTAINER HAVING A BUILT-IN AUTO-HEATING OR AUTO-REFRIGERATING ELEMENT

CROSS-REFERENCE TO RELATED APPLICATIONS

This application is the U.S. National Stage of International Patent Application No. PCT/IB2011/002223 filed on Sep. 26, 2011, which claims priority to Swiss Patent Application No. 01560/10 filed on Sep. 24, 2010, the disclosures of which are hereby incorporated by reference in their entireties.

This invention refers to a flexible container with internal thermo exchange shaped inside like a cascade multipocket envelope or bag, or multichamber or multicell, dispensing (disposable dispenser) a consumer and/or necessity product. The flexible thermo container shaped like a multichamber envelope or bag or multicell or with multiple cells or pockets, with built-in auto-heating or auto-refrigerating internal thermo exchange to prepare self-service products, being the subject of this invention, is founded on the concept "Bag in Bag in Bag".

Target is to obtain an envelope, container for consumer products to be warmed up or cooled down, exploiting endothermic or exothermic reactions. The peculiarity of this execution is that the reaction chamber is fully immersed in the consumer product and provided with a valve controlling a possible pressure generated by the chemical reaction, the reaction bags inside working out the concept of "bag in bag" or "bag in bag in bag".

The progenitor Patent Sarcinella EP1896343, even though in its current effectiveness and application, is improved by this invention which represents its improved form of evolution as regards the use in the sense of being compact, portable, pocket size, handy and ergonomic, as regards the execution in the sense of operation and practicality, safety and simplicity, rationalisation of the internal cells, manufacturing and production process.

The incorporated, fully insulated from the use and/or consumer products, proof reaction chamber allows a better effectiveness besides safety of the endo-exothermic process of chemical reaction improving its thermo efficiency and the distribution and propagation of the amount of heat or cold.

This mainly coming from the new and innovative concept of design and execution of the container according to the "bag in bag" or cascade technique, when not subsequently "bag in bag in bag", and beyond in case of necessity.

The progenitor Patent Sarcinella EP1896343B1, representing a milestone in the field of the flexible container with incorporated thermo exchange and still of practical topicality, represents the closest state of the known technique. By the subject of this invention, it undergoes remarkable improvements representing its innovative evolution.

The possible drawbacks of irregular operation by the high pressures or deformations during the development of the exo-endothermic reactions are avoided by means of suitable safety devices, furthermore the activation of the chemical reaction between the reagent and the reactive liquid as well as the rationalization and safety of the spaces of the containers and the internally incorporated envelopes, as well as the ergonomic manipulation and the portability, as well as improved production and assembling processes.

The multichamber flexible thermo container, subject of this invention, develops and evolves unlike the above-mentioned previous patent the concept "Bag in Bag in Bag" in Chinese boxes or "matrioske" (Russian dolls) fashion.

Such form of packing as flexible container, made of plastic or composite material or metal sheet, with internal incorporated auto-heating or auto-refrigerating thermo exchange for consumer foodstuffs, beverages, liquid dishes, dietetic, cosmetic, medical, pharmaceutical administrations and so on, includes in its multichamber interior a number of envelopes or bags, each with a predetermined role, one of which being a micro-perforated reactive bag.

More precisely this invention refers to a flexible thermo container shaped like a multichamber envelope or bag or multicell or with multiple cells or pockets, with built-in auto-heating or auto-refrigerating internal thermo exchange to prepare self-service products, including means to hold the reagent and the chemical reactive product, separation means provided with seals of said holding means with calibrated resistance, means or baffles to separate the reactive product from the products for the preparation and the use, characterised by the fact that it includes a reaction pocket or chamber provided inside with a first proof container or envelope or bag, deformable by seal walls with controlled breakdown, holding a reactive liquid and a second container or envelope or bag holding exo-endothermic reacting chemical substances of suitable make so that to be able to come in contact with said reactive liquid, said sealed reaction chamber being arranged inside said envelope holding the consumer product(s) of said container.

Said flexible thermo container shaped like an envelope or bag multichamber or multicell with multiple cells or pockets is characterised also by the fact that the second container or envelope holding the exo-endothermic reacting chemical substances is a reactive bag, micro-perforated or otherwise permeable to the reactive liquid or of material allowing the flow of fluids.

Said flexible thermo container shaped like an envelope or bag multichamber or multicell with multiple cells or pockets is characterised also by the fact that the container or envelope of the reactive liquid is inside the container or bag holding the chemical product.

Said flexible thermo container shaped like an envelope or bag multichamber or multicell with multiple cells or pockets allows also that the reaction chamber can be provided with safety devices or means or members.

A further variant of the flexible thermo container shaped like an envelope or bag multichamber or multicell with multiple cells or pockets of the invention is characterised by the fact the reaction chamber is bridge suspended over the delivery spout nozzle.

Another way of execution of the flexible thermo container shaped like a multichamber envelope or bag or multicell or with multiple cells or pockets (Bag in Bag in Bag), with built-in auto-heating or auto-refrigerating internal thermo exchange to prepare self-service products subject of this invention is characterised by the fact that the reaction chamber is inserted into a pocket or sack or pocket made by specific shaping of said envelope holding the consumer product, said pocket being made precisely joining the end edges of the lateral walls of said bag or envelope, forming said sack or pocket, to position and hold said reaction chamber into the hermetic sealed joining of said edges among them, or through a hermetic seal, the activation of the reaction occurring through the pressure originated by the breaking of the bag holding the reaction water, outside or inside the container or bag holding the reagents.

In another way of execution of said flexible thermo container shaped like an envelope or bag multichamber or multicell with multiple cells or pockets, subject of this invention, the external bag is made of a single sheet and the closure of the edges or the sealing can be also reopenable, besides be finally fixed, to obtain a thermally rechargeable container suitable to exploit recharges (reaction chambers) perpetuating and keeping the thermo state (cooling, heating) or the consumer product or for its reutilization or recycling.

The flexible thermo container shaped like an envelope or bag multichamber or multicell with multiple cells or pockets, (Bag in Bag in Bag), with built-in auto-heating or auto-refrigerating internal thermo exchange to prepare self-service consumer products can be also fully made starting from a single sheet in its manufacturing process, preferably for no-food or no-drinkable products.

Otherwise in another variant the flexible thermo container shaped like an envelope or bag multichamber or multicell with multiple cells or pockets, (Bag in Bag in Bag), with built-in auto-heating or auto-refrigerating internal thermo exchange for self-service consumer products, is manufactured making the envelopes or bags, of which is composed, continuously starting from three/four different sheets, then joined on the production line itself, preferably for food or drinkable products.

Another way of execution of the flexible thermo container shaped like an envelope or bag multichamber or multicell with multiple cells or pockets, (concept Bag in Bag in Bag) with built-in auto-heating or auto-refrigerating internal thermo exchange for self-service consumer products, foresees that the chamber or cell building the reaction chamber provided with extendable folds is bonded to the envelope holding the consumer product, and that the bag holding the reactive liquid for the mixing with the reactive granulate into the reaction chamber is provided with a tear edge or tang of activation, arranged on the bottom of said envelope, acting directly on the container of the reactive liquid, causing its breaking and the subsequent mixing of the chemical agents.

The flexible thermo container subject of this invention can be furthermore shaped like a deformable sack or envelope taking the most suitable shape for its packing and transportation, to avoid for instance the wrapping/packing in bottles, with noticeable increase of the characteristics weight/volume ratio, fitness, handiness.

Likewise it shows characteristics such that the preparation of the consumer or use substance and its thermo treatment (cooling, heating) can occur at the same time, also, if wanted, applying a single pressure.

Furthermore in the flexible thermo container being part of this invention the use substance can be heated, respectively cooled, with a thermo gap at least variable in the range from +15° C. to +60° C. upwards with reference to the standard temperature (+15° C.); and at least from −10° C. to −30° C. downwards with reference to the standard temperature (+15° C.)

In some ways of execution the flexible thermo container subject of this invention is also provided with sealing means, like seals, valves, membranes, walls, with predetermined resistance to the pressure, of the different containers or bags, that are driven by a screwed plug able to rotate in the two directions to drive a spindle or another suitable control mean, to stress said bags holding the different reactive and consumer substances, clearing their nozzles/valves, allowing the mixing of the latter, because of the breaking of said sealing means, allowing the communication between the said chambers till then separated by said sealing means.

Thanks to this invention it is realized a flexible thermo container shaped like an envelope or bag multichamber or multicell with multiple cells or pockets, with built-in auto-heating or auto-refrigerating internal thermo exchange for self-service consumer products, shaped like a flexible, deformable, handy, pocket size envelope or bag, which can be activated and started up by compression or traction or rotation, thermo rechargeable, reusable and recyclable.

The container of the invention as above is suitable for many applications and utilizations, like its execution in portable packing for drinkables, liquid foodstuff, sauces, creams and spices; the administration of medicines, drugs, therapeuticals, alimentary supporting and supplementing substances for the wellness, that need a chemical pre-treatment before their administration or use; for dispensers of refreshing, energy-giving, bracing, thirst-quenching beverages and foods and so on, for sport and free time; the application to cosmetic products, body care, beauty and thermal treatments and so on; the application to baby's bottles and dispensers for the nourishment during the childhood; the application to portable work sets for glues, sealing means, fillers, paints, compounds and so on; the application to sets for military provisioning and medical equipment for the Army, Disaster Intervention Civil Force and Humanitarian Help Actions.

We given here below a detailed description of some preferred ways of execution of the subject of this invention, here below given as example only without depriving anything of the generality of the invention, with reference to the drawings of the attached figures:

The FIG. 1 shows in section a preferred way of execution of the container, where the bags holding the reactive liquid and the chemical reactive products are separated and immersed in the reaction chamber.

Figure 1A:
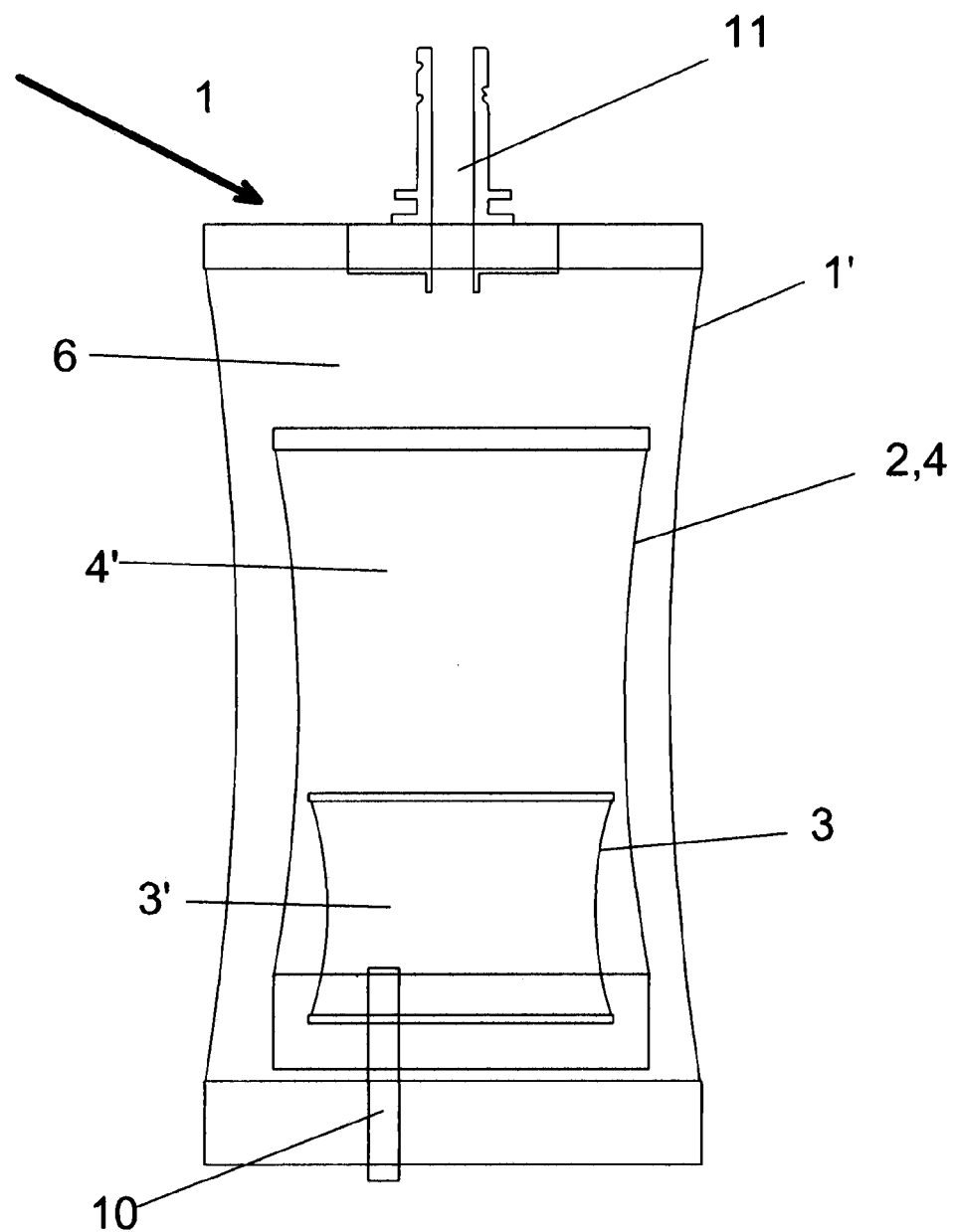
Figure 2:
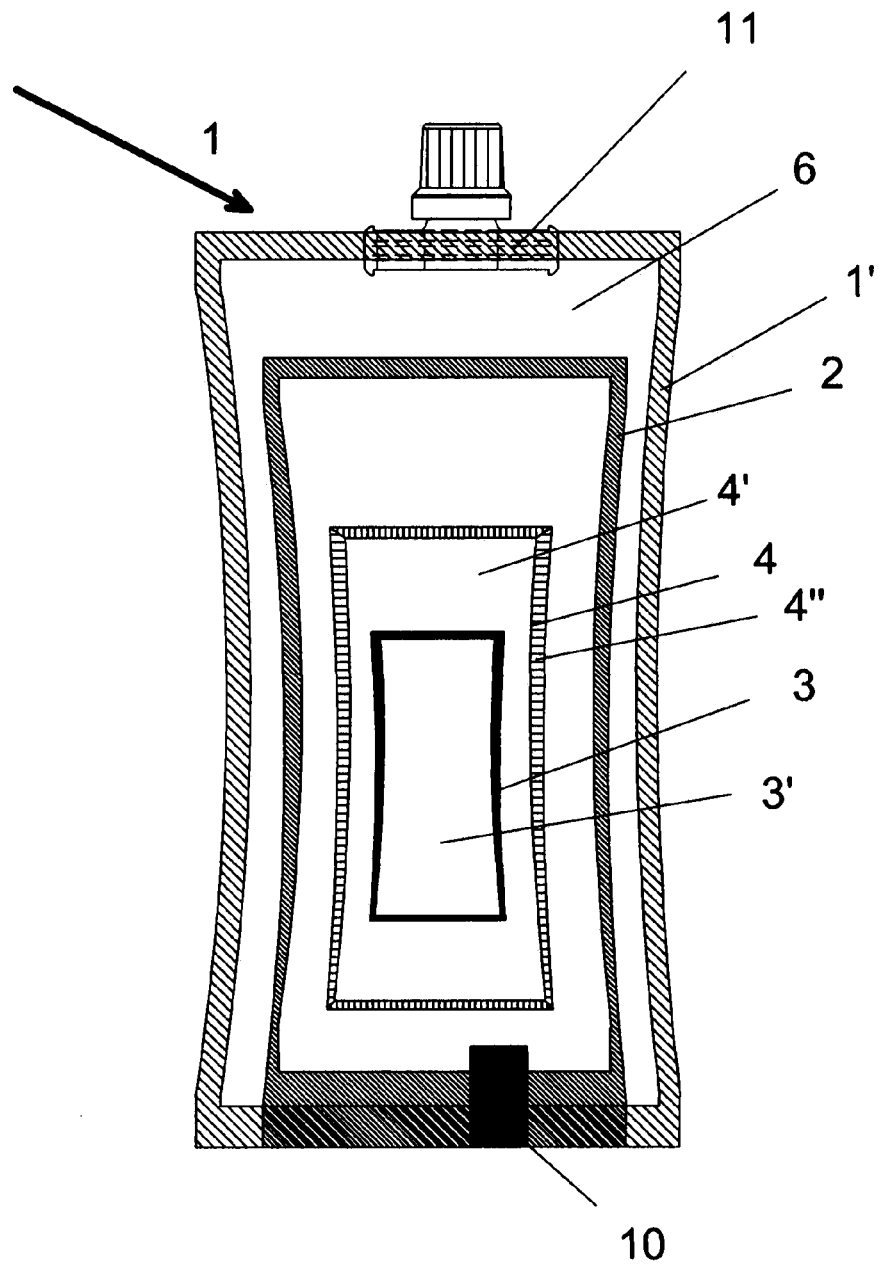
Figure 2A:
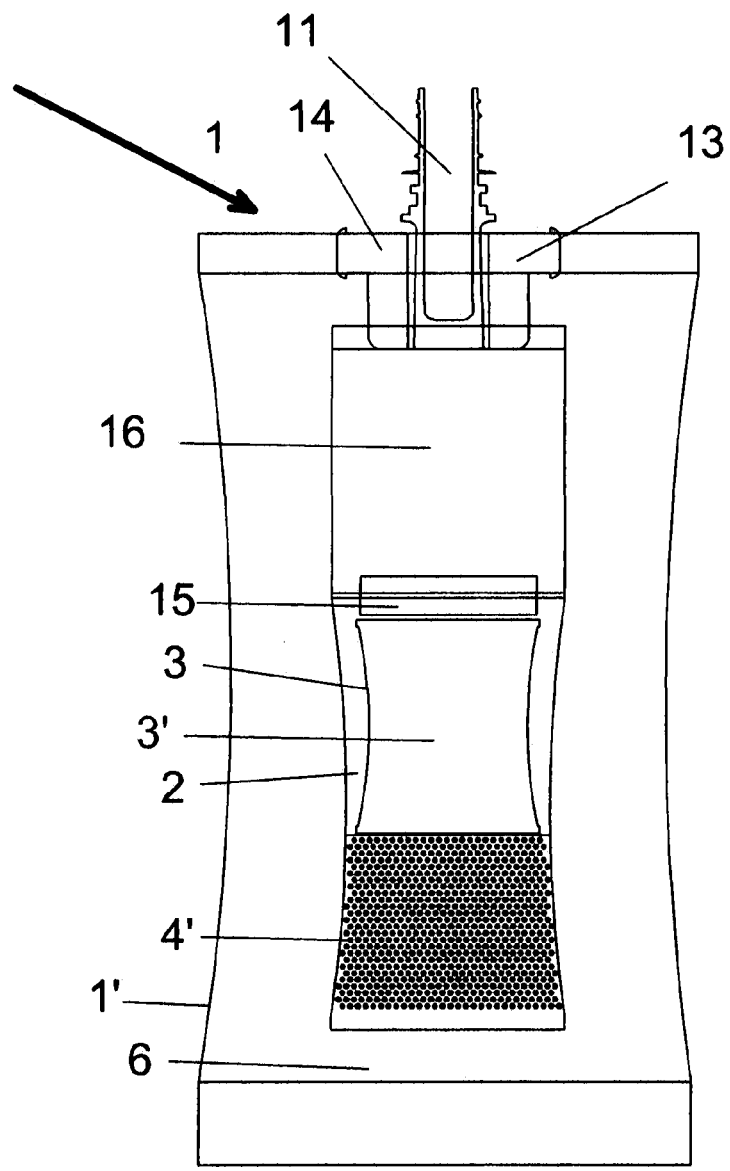
Figure 3:
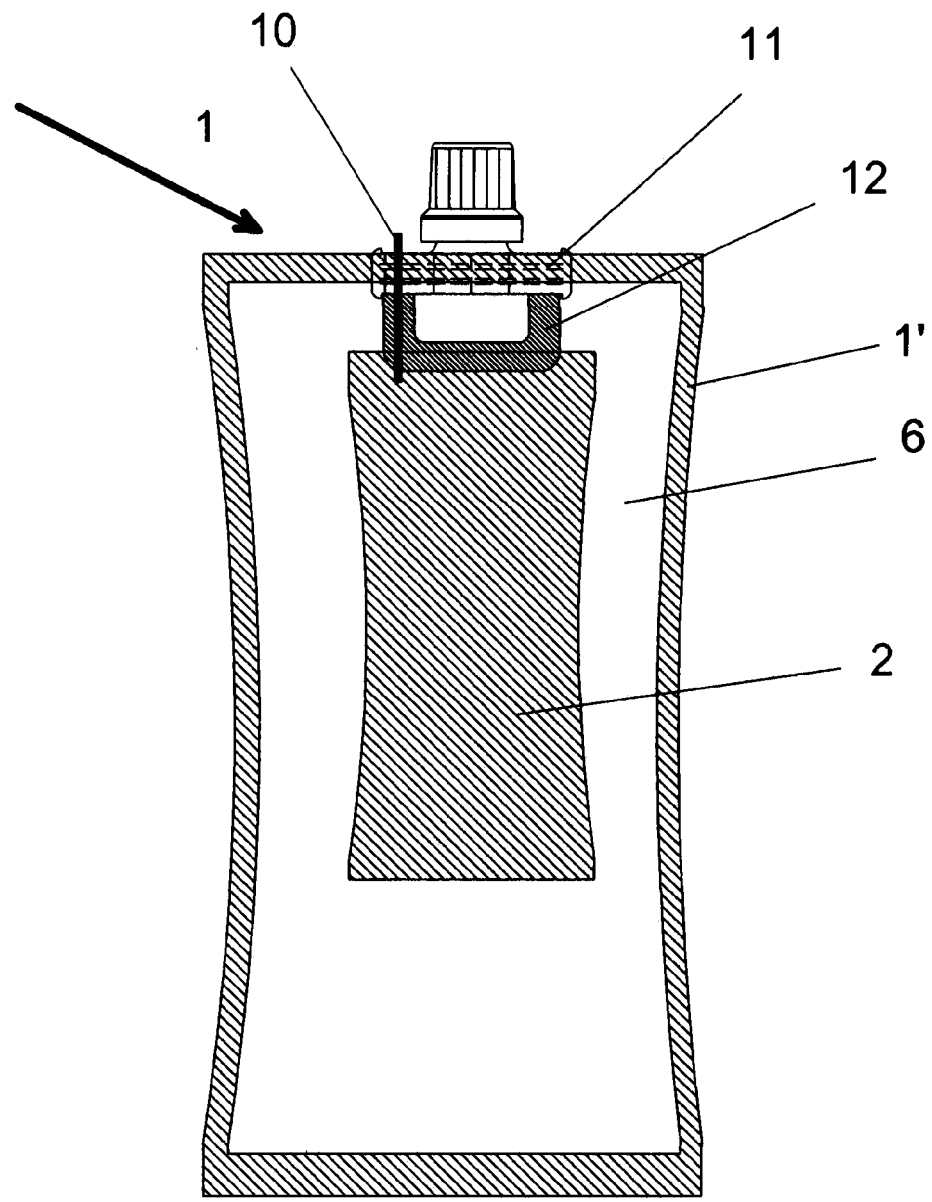

The FIG. 1a show a way of execution of the container of the previous figure with the three bags inserted one into the other (concept bag in bag in bag in . . . ), where the chemical reactive products are directly hold into the reaction chamber, provided with a safety valve;

The FIG. 2 shows the concept bag in bag in bag, where the reactive liquid is hold into the bag of the chemical reactive products and the latter in turn into the reaction chamber hold in the bag of the consumer product;

The FIG. 2a shows a way of execution of the previous where the chemical agents are directly arranged into the reaction chamber this time provided also with expansion chamber and over-pressure exhaust ducts;

The FIG. 3 shows a variant of a way of execution where the reaction bag or chamber is suspended from a bridge fixed to the pressure openable spout;

The FIGS. 4a, 4b, 4c show a particular way of execution of the container like an envelope with internal bag made by bonding of a single sheet, fully separated from the consumer product when required communicating with the outside incorporating the reaction chamber in its different variants;

The FIGS. 5a, 5b, 5c show a way of execution of the container subject of the invention, with rechargeable reaction chamber, made starting from three sheets for food use so that the micro-perforated bag does not go in contact with the liquid food or beverages;

The FIGS. 6a, 6b, 6c describe the container of the invention whit fully flexible bag with thermal starting device through tear tang and breaking of the chamber holding the reactive liquid, arranged inside the reaction chamber provided with extendable folds.

The principle of the idea is to obtain an envelope, container for consumer products to be heated or cooled, exploiting endothermic or exothermic reactions. The peculiarity of this idea is that the reaction chamber is fully immersed in the consumer product and that has a valve controlling a possible pressure generated by the chemical reaction, the reaction bags inside working out the concept "bag in bag" or "bag in bag in bag".

In a first preferred way of execution, FIG. 1, the reaction bag or chamber 2 is inserted and possibly bonded to the envelope, which will hold the consumer product 6.

The start up occurs applying a pressure on the envelope 3 of the reactive liquid 3', also arranged inside the reaction chamber 2. This operation will break the internal bag 3 holding the reactive liquid 3', which will go to mix itself with the reactive granulate 4' of the bag 4, which can be also micro-perforated 4", causing the endo-exothermic reaction into the reaction chamber 2. In case of generation of overpressure vapours into the reaction chamber 2, the pressure will open a valve 10, which will allow the vapour or gas to flow out without to cause the explosion of the bag 1' holding the consumer product 6.

Parts of the Flexible Bag Container 1:
Consumer product bag 1'
Consumer product 6
Reaction chamber 2
Bag holding the reactive liquid 3
Reactive liquid 3'
Bag holding the chemical agents 4, micro-perforated 4"
Chemical agents 4'
Safety valve 10
Sprout or tear zone to open the bag or output hole 11, FIG. 1.

A variant of the previous way of execution of the flexible bag with safety valve (FIG. 1a) is based on the principle of the idea to obtain an envelope 1 for consumer products 6 to be heated or cooled, exploiting endothermic or exothermic reactions. The peculiarity of this idea is that the reaction chamber is fully immersed into the consumer product 6 and that it has a valve 10 controlling a possible pressure generated by the chemical reaction.

Parts of the Flexible Bag Container 1:
Consumer product bag 1'
Consumer product 6
Reaction chamber 2
Bag holding the reactive liquid 3
Reactive liquid 3'
Bag holding the chemical agents 2, 4
Chemical agents 4'
Safety valve 10
Sprout or tear zone to open the bag or output hole 11, The flexible container 1 is composed of three bags, one inserted into the other. The bag holding the reactive liquid 3 is inserted into the reaction chamber bag 2 which this time acts also as container 4 of the chemical agents 4'.

On the bottom of the reaction chamber bag 2, the safety valve 10 will be applied or pressed.

In turn, the reaction chamber bag 2 is inserted into the bag 1' holding the consumer product 6 and bonded.

Applying a pressure on the bag 3 holding the reactive liquid 3' its breaking occurs causing the mixing of the chemical products 4' inside the reaction chamber 2, 4, generating the endothermic and exothermic reaction. In case of excess of pressure inside the reaction chamber, the safety valve 10 helps releasing the pressure outside the container 1 of the consumer products bag 1'. FIG. 1a.

In another way of execution, FIG. 2, the concept chain "bag in bag" is realized, where the bag 3 holding the reactive liquid 3' is contained into the bag 4 holding the reactive products 4', in turn contained in the reaction chamber 2 fully immersed in the consumer product to be heated or cooled, provided with a valve 10 controlling a possible excess of pressure generated by the chemical reaction.

For further safety and efficiency, the bag 4 holding the chemical agents is micro-perforated 4".

Parts of the Flexible Bag Container 1:
Consumer product bag 1'
Consumer product 6
Reaction chamber 2
Bag holding the reactive liquid 3
Reactive liquid 3'
Bag holding the chemical agents 4, micro-perforated 4"
Chemical agents 4'
Safety valve 10
Sprout or tear zone to open the bag or output hole 11, In particular, in this execution the flexible container 1 is composed of three bags 3, 4, 2, each inserted inside the other. The bag 3 holding the reactive liquid 3' is inserted into the reaction chamber bag 4, which holds also the chemical agents 4', in turn contained into the reaction chamber bag 2, said reaction chamber being fully immersed in turn in the bag 1' of the consumer product 6. A valve 10 controlling a possible pressure generated by the chemical reaction completes the flexible container 1, FIG. 2.

A variant of the previous execution includes a flexible container 1 with an expansion chamber 16 with a safety valve 15 and overpressure ducts 13, 14 suspended over the sprout 11, FIG. 2a.

The flexible container 1 of the invention shows a safety device, weakened bonding 15—expansion chamber 16—overpressure ducts 12, 13, controlling a possible overpressure generated by the chemical reaction occurred inside the reaction chamber 2, fully immersed in the bag 1' of the consumer product 6. It is composed of three bags, one inserted into the other. The bag 3 holding the reactive liquid 3' is inserted into the reaction chamber bag 4, which holds in this variant also the chemical agents 4'. The reaction chamber bag 2 shows a weakened bonding 15, which will collapse in case of overpressure allowing the communication of the reaction chamber 2 with the expansion chamber 16. Should the expansion chamber 16 not be sufficient to hold the excess pressure, the latter will discharge itself outside the bag 1' holding the consumer product 6 of the container 1, through the overpressure ducts 13, 14 of the sprout 11.

The application of a pressure on the bag 3 holding the reactive liquid causes its breaking causing the mixing of the chemical products inside the reaction chamber 2 generating the endothermic and exothermic reaction.

Parts of the Flexible Bag Container 1:
Consumer product bag 1'
Consumer product 6
Reaction chamber 2
Bag holding the reactive liquid 3
Reactive liquid 3'
Bag holding the chemical agents 2 (reaction chamber)
Chemical agents 4'
Weakened bonding 15
Expansion chamber or safety zone 16
Sprout or tear zone to open the bag or output hole 11,
Overpressure ducts 13, 14,
FIG. 2a.

Description of the safety system controlling the pressure: The sprout plug 11 includes a zone supporting the thermal element to hook or bond a further chamber suitable to hold liquid or solid products. On the bottom of the support plug, there are safety holes 13, 14 that let the possible further internal chamber communicate with the outside of the packing. A possible overpressure is discharged through the safety holes flowing through the outlets. In case of high-pressure vapours, the safety holes can be provided with a cooling zone.

A different way of execution, FIG. 3, foresees the modification of the design of the sprout 11, adding a bridge 16 where the reaction chamber bag 2 with overpressure valve 10 is then arranged. The whole is then inserted into the envelope 1' holding the consumer product 6. The reaction bag 2 is inserted and possibly bonded to the envelope 1' holding the consumer product 6.

Parts of the Flexible Bag Container 1:
Bridge 12
Consumer product bag 1'
Consumer product 6
Reaction chamber 2
Safety valve 10
Sprout or tear zone to open the bag or output hole 11, FIG. 3.

Another way of execution of the subject of this invention (FIGS. 4a, 4b, 4c) foresees the bag flexible container 1 with envelope 1' of the consumer product 6 provided with internal pocket 8. The peculiarity of this variant is that the envelope 1' of the consumer product is made of a single dual-layer sheet.

The principle of the idea is to obtain an envelope suitable to hold liquid or solid substances with an internal sack, fully separated from the consumer product and, if needed, communicating with the outside. The peculiarity of this idea is that the envelope 1' of the consumer product 6 is made of a single dual-layer sheet folded over its edges 1", 1''' to form the pocket or sack 8 with sealing points 7" of the terminal parts 7, 7', of said edges 1", 1'''.

We start from a bag of plastic material, the external bag 1', which has the characteristic to be a single layer, which with this folding system creates a pocket 8, suitable to contain various materials, as for instance a bag for endothermic or exothermic reactions (element inserted reaction chamber 2). The reaction bag 2 is inserted into the specific pocket 8 made by folding the edges 1", 1" inside the envelope 1' holding the consumer product 6. The pocket 8 formed by the external bag 1' can further be sealed by fixed points 7", also with calibrated collapsing, or temporarily re-openable 9, on sealing points 7, 7'. The bag or reaction chamber 2, holding the bag 3 of the reactive liquid 3' and the bag 4 of the chemical reactive substances 4', like the previous ways of execution, is arranged in a dedicated pocket 8 inside the envelope 1' holding the consumer product 6. The start of the reaction occurs through pressure, which will break the bag 3, holding the reactive liquid 3', in the same way as the above-mentioned variants. The seals or closures 7", 9 can also be with calibrated opening or collapsing in case of overpressure. Furthermore, the pocket 8 can receive new reaction charges or heating or cooling thermal charges to keep the temperature of the consumer product or for further use. The FIGS. 4°, 4b show the container of this variant including a reaction chamber 2 having inside the bag 3 of the reactive liquid 3' and holding the chemical reactive substances 4', while the FIG. 4c shows the bag 1' holding the consumer product 6 in the variant with a larger capacity bulge and reaction chamber including the two separate bags 3, 4 holding respectively the reactive liquid 3' and the chemical reactive substances 4'.

Components of the flexible bag container 1 with internal pocket:
Sprout or tear zone to open the bag or liquid output hole 11,
Consumer product envelope 1'
Consumer product 6
Inserted element (reaction chamber) 2
Envelope 3 holding the reactive liquid 3'
Envelope 4 holding the chemical reactive products 4'
Lateral edges, folds forming the bay, 1", 1'''
Sealing end edges 7,7'
Sealing points 7"
Seal 9
Bag or bay or pocket consumer product envelope 8,
FIGS. 4a, 4b, 4c.

A further foreseen variant of the flexible container of the invention is that shown in the FIGS. 5a, 5b, 5c.

Such particular way of execution shows like the previous one the characteristic to be provided with an internal pocket 8.

But in this one we start with a three-layer plastic sheet, starting the manufacturing not from a single sheet but from three distinct sheets, one of which folded to create the pocket 8 formed by the bag 1' consumer product 6, through its edges 7, 7' made by bending. The bag 3 of the reactive liquid 3', as well as the bag 4 of the chemical agents 4' are obtained from the other distinct sheets and inserted separately inside the pocket 8 to serve as reaction chamber, FIGS. 5a, 5b, or into a separate independent reaction chamber 2 with weakened bonding, then introduced in turn into the pocket or bag 8, FIG. 5c. In both cases a fixed or collapsible openable seal 7", 9 closes the pocket 8 to form or close the reaction chamber 2.

Components of the bag flexible container 1 with internal pocket:
Sprout or tear zone to open the bag or output hole 11 of the liquid,
Consumer product bag 1', with lateral edges 1", 1''',
Consumer product 6
Inserted element (reaction chamber) 2
Envelope 3 holding the reactive liquid 3'
Envelope 4 holding the chemical reactive substances 4'
Lateral edges, bends forming the bay, 1", 1""
End sealing edges 7,7'
Sealing points 7"
Seal 9
Bay or bag or pocket made by consumer product envelope 8,
FIGS. 5a, 5b, 5c.

A further particular way of execution of the flexible container subject of the invention refers to a bag container concept "bag in bag" with tear opening, FIGS. 6, 6b, 6c.

The principle of the idea is to have a fully flexible bag with a traction opening system.

We start from a bag 3 of plastic material holding the liquid 3', which will be utilized for the chemical reaction, the reactive liquid chamber 3. This is inserted into another bag, reaction chamber 2, which serves also as chamber 4 holding the chemical reactive substances 4' and will hold already inside the chemical material 4' for the reaction. The reaction chamber 2 will have bends to allow a stretching. In turn, the reaction chamber 2 is inserted into and fixed to an external bag 1', suitable to hold liquids or solids. The reaction bag 2, 4 is bound to the envelope 1' holding the consumer product 6.

Pulling the tear tang 5 traction is directly put on the chamber 3 of the reactive liquid 3' causing the breaking and the subsequent mixing of the chemical agents 4'. The activation occurs pulling the tang 5 placed on the bottom of the envelope. This operation will break the internal bag 3 holding the reactive liquid 3' which will mix itself with the reactive granulate 4' into the reaction chamber 2.

The bag container with tear opening is composed of the following parts:
Stretchable reaction chamber with bends 2
Breakable reactive liquid chamber 3
Bending of the chamber 2
External bag, consumer product envelope 1' with deformable bottom
Reaction chamber 2, 4
Chamber 3 holding the reactive liquid 3'

Chamber 4 holding the chemical reactive substances 4'

External bag, consumer product envelope 1'

Tear edge or tang 5 to activate the breaking of the reactive liquid chamber

Consumer product 6

Liquid outflow hole 11,

FIGS. 6, 6b, 6c.

With regard to the thermal start and opening devices of the subject container, we give here below a description of a preferred form of execution of the activation starting from a cap on the sprout.

The principle of the idea is based on the use of the cap to break by traction or compression a valve of a container to put in communication chambers, bags, suitable to hold liquid or solid products.

Activation by cap on sprout, not shown in the Figures.

The principle is based on the use of the cap of the container to break by traction or compression a valve in order to put in communication chambers suitable to hold liquid or solid products.

The whole includes 3 main elements:

A sealing cap

A supporting structure

A tensile or compressive structure.

The tensile structure is inserted into the supporting structure and screwed on the sealing cap through an opening thread. The sealing cap is in turn fixed on the supporting structure through a tensile thread.

Turning counter clockwise the sealing cap, the latter turns on the continuous thread.

This operation makes the tensile structure moving using the tensile thread inside the sealing cap causing the lifting or the lowering of the tensile structure.

The movement of the tensile structure is used to put in communication chambers until that point in time separated by valves, membranes, bags and so on, using traction or compression.

This system can also include a sprout with the control of the internal pressure.

Operation:

1. Remove the seal and safety clip

2. Turning the cap in a specific direction (clockwise or counter clockwise), using a specific thread, the tensile element goes up or down according to the project.

3. Turning the cap in the direction opposite to the above, the cap releases the tensile element and gets detached from the support allowing the clearing of the output nozzle.

To this structure, the bags are then applied, holding the chemical products that will serve the exothermic and endothermic reactions.

This element will then be inserted into an envelope holding the consumer product.

Sprout for fizzy drinks.

It is intended to solve the problem of the gas leak from the flexible packing of gassed drinks or liquids as well as the leak of vapours or gases produced inside a possible chamber inside the main packing.

The whole includes two main elements:

1. Mobile cap

2. Cap support

Procedure to release the gas produced by the consumer product:

After having taken away a possible safety seal, it is necessary to turn the mobile cap clockwise or counter clockwise.

This operation will put in communication the output hole of the gas to the zone of storage of gas and liquid, releasing the gas hold inside the packing.

The rotation speed of the mobile cap will set the releasing speed of the gas.

Later on to clear the output hole of the liquid, it is necessary to push the mobile cap towards the cap support.

Repeating the operation backwards, this system becomes again sealed.

The flexible thermal container 1 shaped like an envelope or bag 1' multichamber or multicell or with multiple cells or pockets realizes the concept "Bag in Bag (bag in bag in bag)" like Chinese boxes or "matrioske" (Russian dolls), foresees the built-in auto-heating or auto-refrigerating internal thermal exchange for self-service consumer products and includes essentially a reaction bay or chamber 2 provided inside with a first sealed deformable container or envelope 3, with sealing walls, with controlled collapsing, holding a reactive liquid 3' and with a second container or envelope 4 holding exo-endothermic chemical reactive substances 4' of suitable type in order to can enter in contact with the reactive liquid 3', the sealed reaction chamber 2 being arranged inside the envelope 1' holding the consumer product(s) of the container 1.

When the envelopes or bags 3 holding the reactive liquid 3' and 4 holding the chemical reactive substances 4' are separately arranged inside the reaction chamber 2, we refer to the execution of the FIG. 1, when the chemical reactive substances are directly hold inside the reaction chamber we refer to the execution of the FIG. 1a, when on the contrary the envelope 3 of the reactive liquid 3' is contained into the envelope 4 of the chemical reactive substances we refer to the execution of the Figure v2, and in the variant where the reaction chamber serves directly also as support of the chemical reactive substances 4' we refer to the execution of the FIG. 2a.

The bags holding the reagent 3 and the chemical reactive product 4 are provided with separation baffles or sealing means with calibrated resistance so that they come in contact only under a predefined stress or action, the same for the envelopes or bags 1' holding the ingredients for the preparation of the consumer product 6, being the separation baffles of the reactive product and those for the preparation of the consumer product well distinct and isolated in order not to enter in mutual contact.

To increase effectiveness and safety of the endo-exothermic chemical reaction we decided for bags 4 holding the chemical reactive substances 4' of micro-perforated type 4", FIGS. 1, 2.

Likewise, we use in this invention reaction chambers with safety valve 10 in the execution of the FIGS. 1, 1a, 2, or with overpressure expansion chamber 16 with separation baffle 15, weakened bonding, calibrated breaking and overpressure ducts 13, 14 in the execution of the FIG. 2a.

Another execution, in the way of execution of the reaction chamber 2 bridge suspended over the delivery spout 11 of the consumer product 6, and inserted and immersed into the envelope 1' of the container 1, is shown by the FIG. 3. In a different way of execution, bag with internal pocket, the envelope 1' holding the consumer product 6 of the flexible container 1 shows two terminal edges or ends 7, 7', one for each lateral wall or side 1", 1''' of the envelope or bag 1', that joining together create a bag or pocket 8, where it is possible to house the reaction chamber 2. The reaction bag 2 can be of the "bag in bag" type, where the bag or envelope 3 of the reactive liquid 3' is arranged inside the container of the reactive products 4', container, which can be a distinct bag 4, or the reaction chamber 2 itself, FIGS. 4a, 4b. Otherwise the two bags 3 and 4 of the reagents, liquid and chemical substances, can be distinct and separated inside the reaction chamber 2, FIG. 4c.

To close the reaction chamber 2, the edges are joined in the joint 7', usually by bonding which can also be calibrated, FIGS. 4a, 4b, or through a seal 9 which can also be calibrated, FIG. 4c.

We start from a bag of plastic material, the external bag 1', which has the characteristic to be single-layer, which with this bending system creates a pocket 8 suitable to hold various material, as for instance a bag for endothermic or exothermic reactions (inserted element reaction chamber 2) or thermal recharges.

The pocket 8 of he external bag 1' can be sealed in fixed or re-openable way on the sealing points 7", 9, FIGS. 4a, 4b, 4c.

The start of the reaction occurs the through the compressive stress by breaking the bag container 3 holding the reactive water 3' inside or outside the container or bag 4 of the reagent 4', FIGS. 4a, 4b, 4c.

The principle of the idea is to obtain an envelope suitable to hold liquids or solids with an internal pocket, fully separated from the consumer product and, if needed, communicating with the exterior.

The same previous way of execution can be adopted in case the container 1 is intended to hold drinks or foods starting its manufacturing instead of from a single multi-layer sheet, from three sheets, that central being bend, while the previous one, more suitable for drugs, cosmetic or other, is manufactured starting from a single sheet, FIGS. 5a, 5b, 5c.

The product is composed of three bags manufactured starting from three sheets, one inserted into the other. The bag 3 holding the reactive liquid 3' is inserted into the reaction chamber bag 2, holding also the chemical agents 4'.

For better safety in case of foods, we use a micro-perforated bags so that the chemical reactive products do not come in contact with the liquid foods or drinks.

In these two last executions, we obtain a container with rechargeable chamber to regenerate or to keep the thermal exchange. Furthermore, the sealing 7", 9 of the edges can be final or re-openable. This to allow using recharges (reaction chamber).

The sealing 7", 9 of the edges can be final or re-openable this to allow to use recharges (reaction chamber), obtaining a thermally rechargeable suitable to use recharges (reaction chamber) to perpetuate and keep the thermal state (cooling, heating) of the consumer product 6 or for its re-use or recycling.

At the end in another preferred way execution in the flexible thermal container 1 shaped like an envelope or bag 1' multichamber or multicell or with multiple cells or pockets, based on the "bag in bag in bag" concept, with built-in auto-heating or auto-refrigerating internal thermal exchange for self-service consumer products, the chamber or cell forming the reaction chamber 2 is bound to the envelope or bag 1' holding the consumer product 6, said reaction chamber 2 holds the bag 3 holding the reactive liquid 3' which will mix with the reactive granulate 4' in the same reaction chamber 2, and is provided with a tear edge or tang 5 placed on the bottom of the envelope 1' and joined to the bag of the reactive liquid, to cause its breaking, FIGS. 6a, 6b, 6c.

We start from a bag 3 of plastic material holding the liquid 3', which will be used for the chemical reaction. This one, reactive liquid chamber, is inserted into another bag forming the reaction chamber 2 holding inside the chemical material 4' for the reaction. The reaction chamber 2 shows some bends, while the bottom of the bag 1' is made by two walls showing an angle between them, concave at rest, convex in operation, to allow their stretching.

In turn, the reaction chamber 2 is inserted into and fixed to the external bag 1', suitable to contain liquids or solids.

Pulling the tear tang 5 causes a traction directly on the reactive liquid chamber 3 causing its breaking and the subsequent mixing of the chemical agents into the reaction chamber 2, FIGS. 6a, 6b, 6c.

The container subject of the invention is shaped like flexible envelope or bag, deformable, portable, pocket size, handy, to be put in operation by compression or traction or rotation. Because of its flexibility, it is deformable and can take the most suitable shape for its packing and transportation, avoiding for instance the wrapping/packing as bottles, with noticeable increase of the characteristic weight/volume ratio, fitness, handling. Into it the preparation of the use substance and its thermo treatment (cooling, heating) can occur at the same time, also, if wanted, applying a single pressure.

Such use substance or consumer product 6 can be heated, respectively cooled, with a thermo gap at least variable in the range from +15° C. to +60° C. upwards with reference to the standard temperature (+15° C.); and at least from −10° C. to −30° C. downwards with reference to the standard temperature (+15° C.)

The container of the invention finds particular application and use for portable packing for drinkables, liquid foodstuff, sauces, creams and spices as well as for dispensers or administrators of refreshing, energy-giving, bracing, thirst-quenching beverages and foods and so on, for sport and free time.

In the same way it finds particular use for ready-to-use packing for medicines, drugs, therapeuticals, alimentary supporting and supplementing substances for the wellness, that need a chemical pre-treatment before their administration or use; for dispensers of refreshing, energy-giving, bracing, thirst-quenching beverages and foods and so on, for sport and free time; the application to cosmetic products, body care, beauty and thermal treatments and so on.

It is very well suitable for use in baby's bottles and dispensers for the nourishment during the childhood.

Likewise the flexible thermal container shaped as envelope or bag finds particular use and application to portable work sets for glues, sealing means, fillers, paints, compounds and so on for craftsmen and do-it-yourself.

Furthermore, it is suitable to play a very important role in its use and application to military provisioning and medical equipment for the Army, Disaster Intervention Civil Force and Humanitarian Help Actions.

We believe that the subject of this invention means a radical innovation on the market of drinkables, particularly those handy that will bring with it beyond technical and industrial innovations of manufacturing and production, also noticeable implications in the field of consumers and social relations, as already happened with other recent technologies in other fields.

The invention claimed is:

1. A flexible thermal container for storing and heating and/or cooling a product present in the flexible thermal container, the flexible thermal container comprising:
   an external bag; and
   a pocket,
   the external bag configured to enclose a consumer product zone and the pocket, the pocket being isolated from the consumer product zone and the pocket being in thermal communication with the consumer product zone, the pocket comprising:
an opening through the external bag to an area not enclosed by the external bag;
wherein the pocket is configured to receive through the opening a reaction chamber comprising a first container or a reactive liquid and a second container of a chemical agent, wherein when the reactive liquid and the chemical agent are mixed, a heating or a cooling reaction occurs;
the opening being configured to be closed after the reaction chamber is inserted through the opening,
wherein the flexible thermal container is an envelope or a bag.

2. The flexible thermal container of claim 1, wherein the second container is a permeable bag configured to allow the flow of fluid therethrough.

3. The flexible thermal container of claim 1, where the first container is inside the second container.

4. The flexible thermal container of claim 1, further comprising:
a spout outlet nozzle; and
a bridge extending from the spout outlet nozzle,
wherein the reaction chamber is supported from the zone spout output nozzle by the bridge.

5. The flexible thermal container of claim 1, wherein the reaction chamber further comprises one or more safety devices or means.

6. The flexible thermal container of claim 1, wherein the reaction chamber further comprises one or more safety devices or means, the one or more safety devices or means comprising an expansion chamber, communicating with the reaction chamber through a weakened bonding, and the expansion chamber connected to overpressure ducts.

7. The flexible thermal container of claim 1, wherein the external bag, the reaction chamber, the first container and the second container, are manufactured starting from three or four separate sheets.

8. The flexible thermal container of claim 1, wherein the reaction chamber further comprises folds,
wherein the reaction chamber is expandable at the folds, is bound to the external bag, and the first container comprises a starting tear edge or tang located on the bottom of the flexible thermal container, the starting tear edge or tang configured to when pulled, break the first container and cause the subsequent mixing of the reactive liquid and the chemical agent.

9. The flexible thermal container of claim 1, wherein the flexible thermal container is shaped like a deformable bag or envelope.

10. The flexible thermal container of claim 1, wherein the preparation of the consumer product present in the thermal flexible container and its cooling or heating occurs at the same time by applying a single pressure.

11. The flexible thermal container of claim 1, wherein the consumer product present in the flexible thermal container can be heated, respectively cooled, with a thermo gap at least variable in the range from +15° C. to +60° C. upwards with reference to the standard temperature (+15° C.); and at least from −10° C. to −30° C. downwards with reference to the standard temperature (+15° C).

12. The flexible thermal container of claim 1, wherein said flexible thermal container is activated and started up by compression or traction or rotation.

13. The flexible thermal container of claim 1, wherein the pocket has a top located opposite the opening and left and right sides located intermediate the opening and the top, the pocket located within the consumer product zone such that the consumer product zone is present at the left and right sides and the top of the pocket.

14. The flexible thermal container of claim 1, wherein the reaction chamber is configured to be activated by breaking the first container.

15. The flexible thermal container of claim 1, wherein the pocket is configured such that a used reaction chamber can be replaced with an unused reaction chamber.

16. The flexible thermal container of claim 1, wherein the first side of the outer pocket is a continuation of a first side of the external bag, located at a first fold, and a second side of the pocket is a continuation of a second side of the external bag, located at a second fold, and the opening comprises the first and second folds.

17. The flexible thermal container of claim 1, wherein the opening can be closed permanently or closed and reopened.

18. The flexible thermal container of claim 1, wherein the external bag is made from a single sheet.

19. The flexible thermal container of claim 1, further comprising the reaction chamber positioned in the pocket.

20. A method heating and/or cooling a product present in a product zone of a flexible thermal container, the method comprising:
contacting at least a portion of a reactive liquid with at least a portion of a chemical agent, wherein the flexible thermal container comprises:
an external bag; and
a pocket,
the external bag configured to enclose the consumer product zone and the pocket, the pocket being isolated from the consumer product zone and the pocket being in thermal communication with the consumer product zone,
the pocket comprising:
an opening through the external bag to an area not enclosed by the external bag;
wherein the pocket has received through the opening a reaction chamber comprising a first container of the reactive liquid and a second container of the chemical agent, wherein when the reactive liquid and the chemical agent are mixed, a heating or a cooling reaction occurs;
the opening being configured to be closed after the reaction chamber is inserted through the opening,
wherein the flexible thermal container is an envelope or a bag.

* * * * *